United States Patent
Ozturk et al.

(10) Patent No.: US 11,463,952 B2
(45) Date of Patent: Oct. 4, 2022

(54) INDICATION SIGNAL REPETITION FOR DISCONTINUOUS RECEPTION OPERATION

(71) Applicant: QUALCOMM Incorporated, San Diego, CA (US)

(72) Inventors: Ozcan Ozturk, San Diego, CA (US); Xiaoxia Zhang, San Diego, CA (US); Jing Sun, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 16/719,867

(22) Filed: Dec. 18, 2019

(65) Prior Publication Data

US 2020/0205074 A1  Jun. 25, 2020

Related U.S. Application Data

(60) Provisional application No. 62/783,669, filed on Dec. 21, 2018.

(51) Int. Cl.
*H04W 52/02* (2009.01)
*H04W 72/04* (2009.01)
*H04L 5/00* (2006.01)

(52) U.S. Cl.
CPC ......... *H04W 52/0216* (2013.01); *H04L 5/005* (2013.01); *H04W 52/0219* (2013.01); *H04W 72/0446* (2013.01)

(58) Field of Classification Search
CPC ......... H04W 52/0216; H04W 52/0219; H04W 72/0446; H04L 5/005
See application file for complete search history.

(56) References Cited

U.S. PATENT DOCUMENTS

| 10,660,152 B1 * | 5/2020 | Raghunathan | H04W 88/10 |
| 2004/0018850 A1 * | 1/2004 | Ishiguro | H04W 52/325 455/522 |
| 2005/0272423 A1 * | 12/2005 | Stephens | H04W 74/06 455/434 |

(Continued)

OTHER PUBLICATIONS

Huawei., et al., "On 'Wake-Up Signal' for eFeMTC", 3GPP Draft; R1-1707018, 3rd Generation Partnership Project (3GPP), Mobile Competence Centre, 650, Route Des Lucioles ; F-06921 Sophia-Antipolis Cedex, France, vol. RAN WG1, No. Hangzhou, China; May 15, 2017-May 19, 2017, May 14, 2017 (May 14, 2017), XP051272248, 7 Pages, Retrieved from the Internet: URL: http://www.3gpp.org/ftp/Meetings_3GPP_SYNC/RAN1/Docs/ [retrieved on May 14, 2017].

(Continued)

*Primary Examiner* — Benjamin H Elliott, IV
*Assistant Examiner* — Nevena Zecevic Sandhu
(74) *Attorney, Agent, or Firm* — Harrity & Harrity, LLP\Qualcomm

(57) ABSTRACT

A wireless node may transmit, to a user equipment (UE), a plurality of repetitions of an indication signal to indicate one or more parameters relating to a subsequent transmission of a physical downlink control channel (PDCCH). The wireless node may also transmit the PDCCH after the plurality of repetitions of the indication signal and in accordance with the one or more parameters of the indication signal.

30 Claims, 8 Drawing Sheets

(56) References Cited

U.S. PATENT DOCUMENTS

| | | | |
|---|---|---|---|
| 2013/0128788 A1* | 5/2013 | Guey | H04W 52/0216 |
| | | | 370/311 |
| 2014/0098761 A1 | 4/2014 | Lee et al. | |
| 2016/0056935 A1* | 2/2016 | Damnjanovic | H04W 76/27 |
| | | | 370/252 |
| 2017/0353255 A1* | 12/2017 | Islam | H04L 27/2662 |
| 2018/0270756 A1 | 9/2018 | Bhattad et al. | |
| 2019/0052432 A1* | 2/2019 | Islam | H04L 5/0005 |
| 2020/0068648 A1* | 2/2020 | Lin | H04W 72/042 |
| 2021/0167930 A1* | 6/2021 | Jeon | H04L 27/2607 |
| 2021/0185614 A1* | 6/2021 | Zhou | H04L 5/0051 |
| 2021/0204214 A1* | 7/2021 | Chang | H04W 52/0229 |

OTHER PUBLICATIONS

International Search Report and Written Opinion—PCT/US2019/067558—ISA/EPO—dated Apr. 9, 2020.

\* cited by examiner

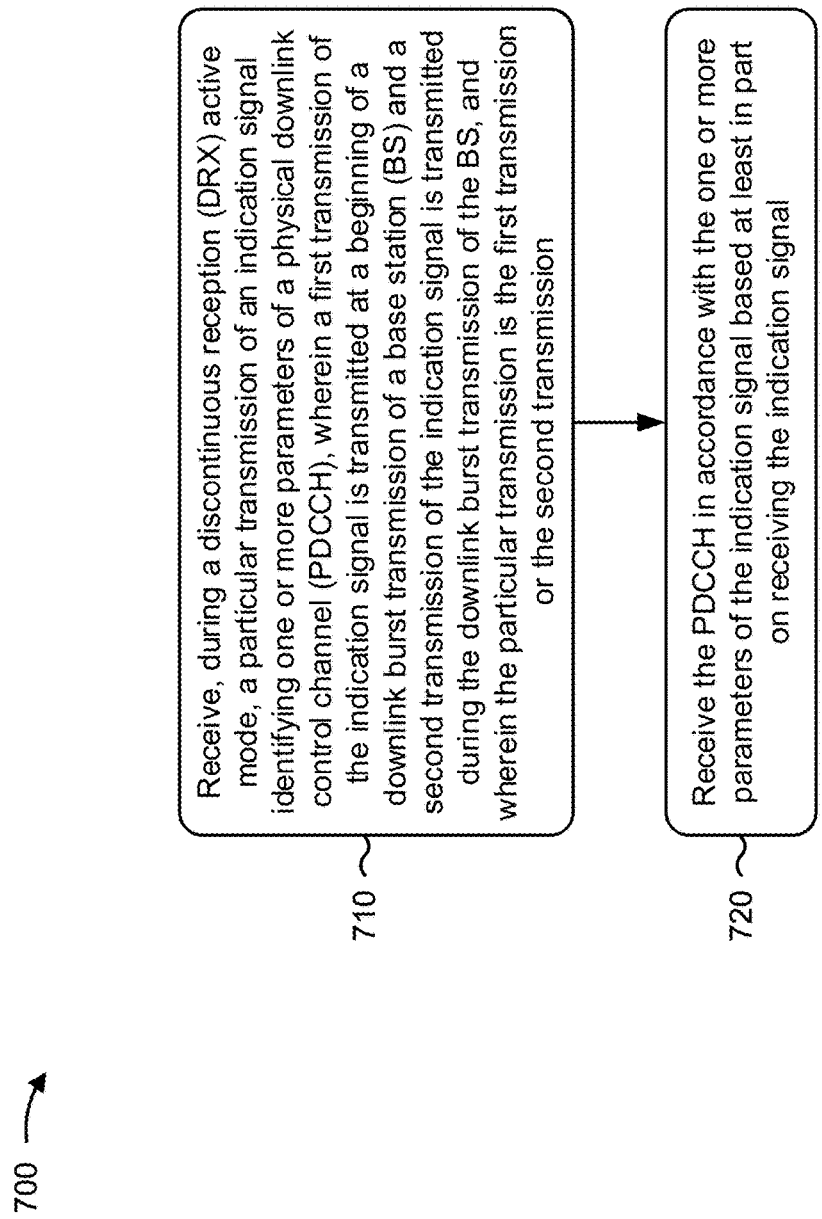

INDICATION SIGNAL REPETITION FOR DISCONTINUOUS RECEPTION OPERATION

CROSS-REFERENCE TO RELATED APPLICATION

This application claims priority to U.S. Provisional Patent Application No. 62/783,669, filed on Dec. 21, 2018, entitled "INDICATION SIGNAL REPETITION FOR DISCONTINUOUS RECEPTION OPERATION," which is hereby expressly incorporated by reference herein.

FIELD OF THE DISCLOSURE

Aspects of the present disclosure generally relate to wireless communication, and to techniques and apparatuses for indication signal repetition for discontinuous reception operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a user equipment (UE), may include receiving, during a discontinuous reception (DRX) active mode, a particular transmission of an indication signal identifying one or more parameters of a physical downlink control channel (PDCCH), wherein a first transmission of the indication signal is transmitted at a beginning of a downlink burst transmission of a base station (BS) and a second transmission of the indication signal is transmitted during the downlink burst transmission of the BS, and wherein the particular transmission is the first transmission or the second transmission. The method may include receiving the PDCCH in accordance with the one or more parameters of the indication signal based at least in part on receiving the indication signal.

In some aspects, a UE for wireless communication may include memory and one or more processors operatively coupled to the memory. The memory and the one or more processors may be configured to receive, during a discontinuous reception (DRX) active mode, a particular transmission of an indication signal identifying one or more parameters of a physical downlink control channel (PDCCH), wherein a first transmission of the indication signal is transmitted at a beginning of a downlink burst transmission of a base station (BS) and a second transmission of the indication signal is transmitted during the downlink burst transmission of the BS, and wherein the particular transmission is the first transmission or the second transmission. The memory and the one or more processors may be configured to receive the PDCCH in accordance with the one or more parameters of the indication signal based at least in part on receiving the indication signal.

In some aspects, a non-transitory computer-readable medium may store one or more instructions for wireless communication. The one or more instructions, when executed by one or more processors of a UE, may cause the one or more processors to receive, during a discontinuous reception (DRX) active mode, a particular transmission of an indication signal identifying one or more parameters of a physical downlink control channel (PDCCH), wherein a first transmission of the indication signal is transmitted at a beginning of a downlink burst transmission of a base station (BS) and a second transmission of the indication signal is transmitted during the downlink burst transmission of the BS, and wherein the particular transmission is the first transmission or the second transmission. The one or more instructions, when executed by the one or more processors of the UE, may cause the one or more processors to receive the PDCCH in accordance with the one or more parameters of the indication signal based at least in part on receiving the indication signal.

In some aspects, an apparatus for wireless communication may include means for receiving, during a discontinuous reception (DRX) active mode, a particular transmission of an indication signal identifying one or more parameters of a physical downlink control channel (PDCCH), wherein a first transmission of the indication signal is transmitted at a beginning of a downlink burst transmission of a base station (BS) and a second transmission of the indication signal is transmitted during the downlink burst transmission of the BS, and wherein the particular transmission is the first transmission or the second transmission. The apparatus may include means for receiving the PDCCH in accordance with the one or more parameters of the indication signal based at least in part on receiving the indication signal.

In some aspects, a method of wireless communication, performed by a base station, may include transmitting, to a user equipment (UE), a plurality of repetitions of an indication signal to indicate one or more parameters relating to a subsequent transmission of a physical downlink control channel (PDCCH), wherein at least one repetition of the indication signal is transmitted during a discontinuous reception (DRX) active mode of the UE. The method may include transmitting the PDCCH after the plurality of repetitions of the indication signal and in accordance with the one or more parameters of the indication signal.

In some aspects, a base station for wireless communication may include memory and one or more processors operatively coupled to the memory. The memory and the one or more processors may be configured to transmit, to a user equipment (UE), a plurality of repetitions of an indication signal to indicate one or more parameters relating to a subsequent transmission of a physical downlink control channel (PDCCH), wherein at least one repetition of the indication signal is transmitted during a discontinuous reception (DRX) active mode of the UE. The memory and the one or more processors may be configured to transmit the PDCCH after the plurality of repetitions of the indication signal and in accordance with the one or more parameters of the indication signal.

In some aspects, a non-transitory computer-readable medium may store one or more instructions for wireless communication. The one or more instructions, when executed by one or more processors of a base station, may cause the one or more processors to transmit, to a user equipment (UE), a plurality of repetitions of an indication signal to indicate one or more parameters relating to a subsequent transmission of a physical downlink control channel (PDCCH), wherein at least one repetition of the indication signal is transmitted during a discontinuous reception (DRX) active mode of the UE. The one or more instructions, when executed by the one or more processors of the base station, may cause the one or more processors to transmit the PDCCH after the plurality of repetitions of the indication signal and in accordance with the one or more parameters of the indication signal.

In some aspects, an apparatus for wireless communication may include means for transmitting, to a user equipment (UE), a plurality of repetitions of an indication signal to indicate one or more parameters relating to a subsequent transmission of a physical downlink control channel (PDCCH), wherein at least one repetition of the indication signal is transmitted during a discontinuous reception (DRX) active mode of the UE. The apparatus may include means for transmitting the PDCCH after the plurality of repetitions of the indication signal and in accordance with the one or more parameters of the indication signal.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a user equipment, in accordance with various aspects of the present disclosure.

DETAILED DESCRIPTION

Figure 1:
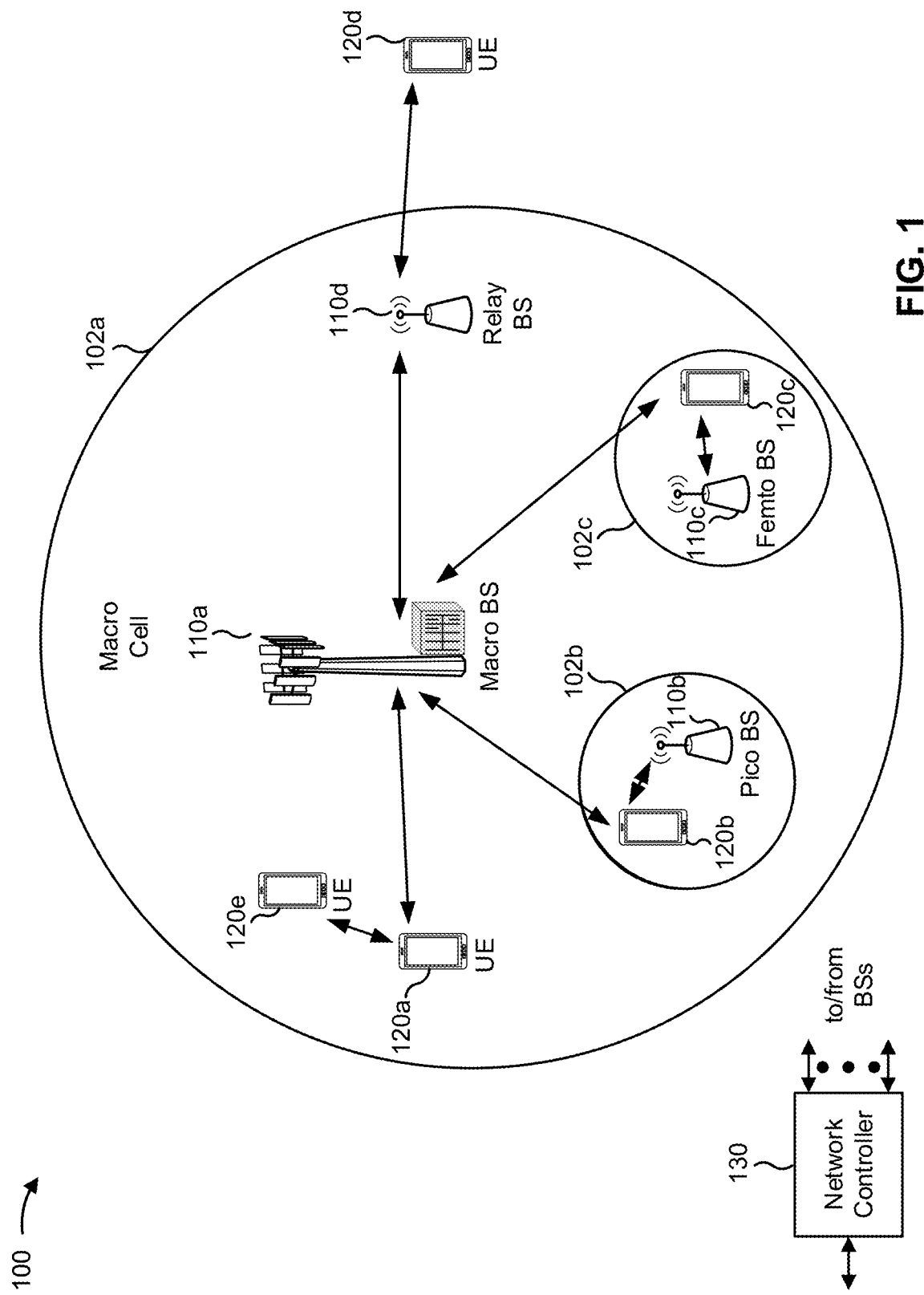
FIG. 1 is a block diagram conceptually illustrating an example of a wireless communication network, in accordance with various aspects of the present disclosure.

In some communications systems, such as 5G or NR, user equipment (UEs) may be configured with a plurality of operation modes. For example, a UE may operate in a discontinuous reception (DRX) active mode, a DRX idle mode, a DRX sleep mode, and/or the like, which may be termed an active mode, an idle mode, and a sleep mode, respectively. In some cases, the DRX active mode may be termed a DRX active time or a DRX ON mode. The UE may determine whether to transfer between modes based at least in part on a timer. For example, on expiration of an inactivity timer, the UE may determine to transfer from an active mode to an idle mode or a sleep mode. The UE may periodically monitor for a low power indication signal in connection with a downlink burst transmission of a base station (BS). For example, the UE may monitor a downlink during an ON duration of an active mode. The BS may provide an indication signal as an initial signal of the downlink burst transmission. The indication signal may include information identifying one or more parameters for receiving a subsequent physical downlink control channel (PDDCH) from the BS. For example, the UE may receive the indication signal, and may determine to monitor for the PDCCH at a particular time, thereby enabling the UE to receive the PDCCH.

However, in some cases, the BS may not have access to a channel for providing the indication signal during a DRX ON duration of a DRX active mode of the UE. As a result, the UE may monitor during the DRX ON duration, and may fail to receive information from the BS, which may result in wasted power consumption by the UE. Further, when the BS transmits the indication signal at a beginning of the downlink burst transmission (e.g., as an initial signal), the UE may not have woken up from an idle mode or a sleep mode. In other words, the UE may transfer from the idle mode or the sleep mode to an active mode after the BS provides the indication signal, which may result in the UE failing to receive the indication signal. As a result, the UE may fail to receive a subsequent PDCCH identified by the indication signal.

Some aspects described herein provide indication signal repetition for DRX operation. For example, the BS may transmit a first transmission of the indication signal at a beginning of a downlink burst transmission and may subsequently transmit a second transmission of the indication signal (e.g., a repetition of the indication signal) during the downlink burst transmission. In this way, the BS may reduce a likelihood that the UE fails to receive the indication signal based at least in part on the BS not having access to a channel at a start of an ON duration and/or based at least in part on UE not having transferred to the active mode at a beginning of the downlink burst transmission, thereby reducing wasted power consumption. Further, based at least in part on reducing a likelihood that the UE fails to receive the indication signal, the BS may increase a likelihood that the UE receives a subsequent PDCCH transmission, thereby improving network performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*, 120*d*, 120*e*) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. In some aspects, control of the air interface may be performed using a control channel. For example, a BS may transmit a physical downlink control channel (PDCCH) to a UE to control use of a network. In this case, the BS may transmit repetitions of an indication signal to indicate, to the UE, a monitoring period for monitoring for the PDCCH. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
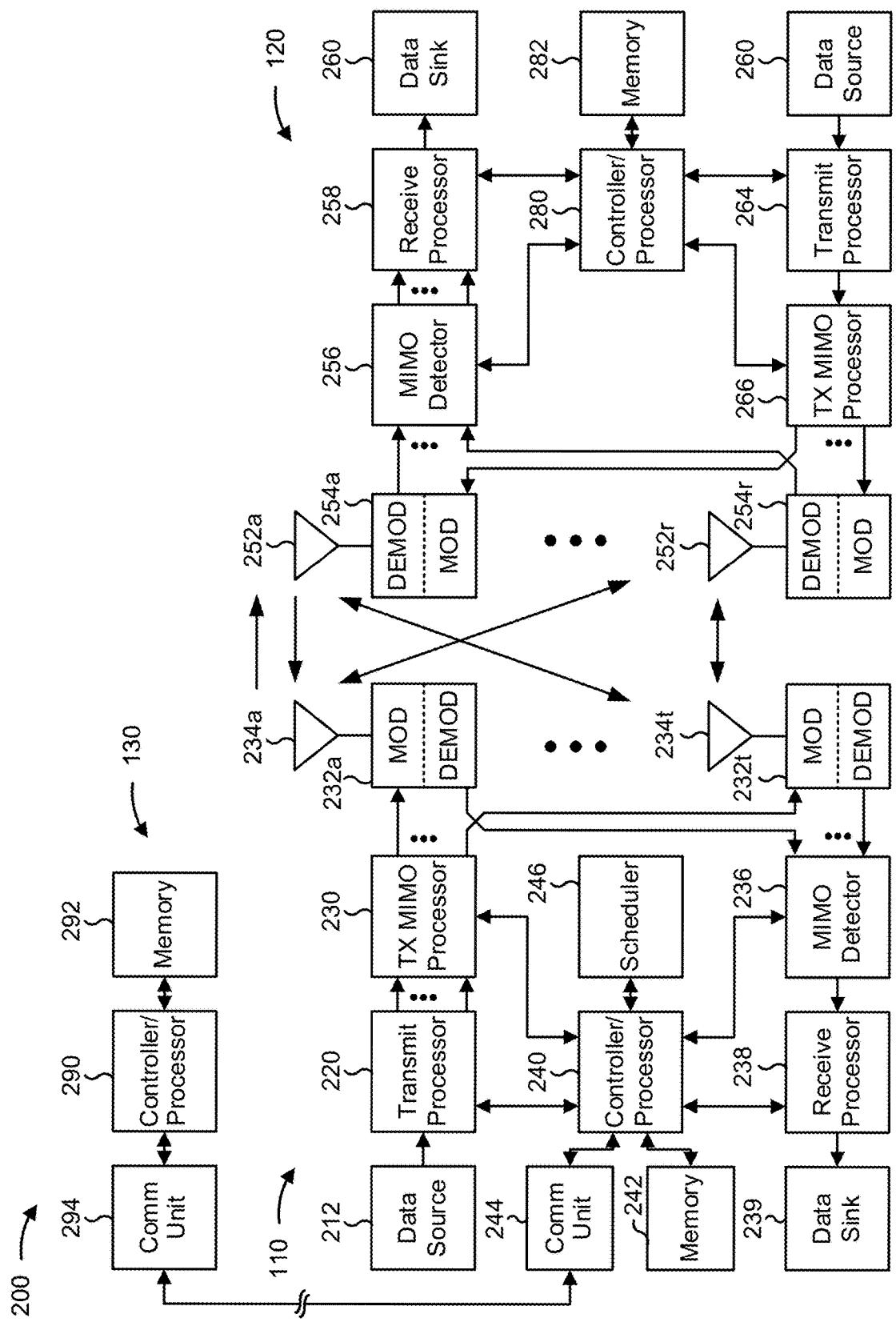
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. For example, UE 120 may use antennas 252a through 252r to monitor a downlink to receive a burst transmission from BS 110. In this case, UE 120 may receive an indication signal at a beginning of the burst transmission, during the burst transmission, and/or the like, based at least in part on BS 110 transmitting a plurality of repetitions of the indication signal. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with indication signal repetition for discontinuous reception operation, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

Figure 6:
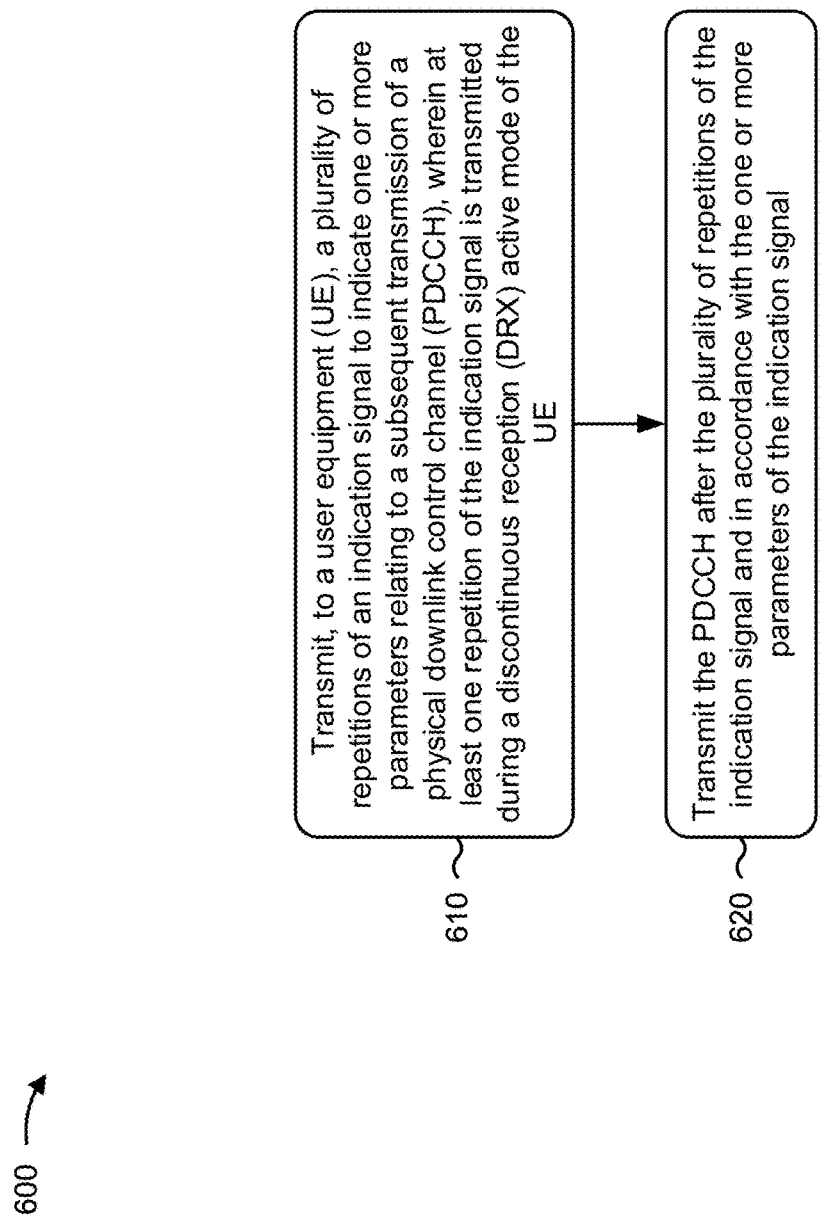
FIG. 6 is a diagram illustrating an example process performed, for example, by a base station, in accordance with various aspects of the present disclosure.

The stored program codes, when executed by processor 280 and/or other processors and modules at UE 120, may cause the UE 120 to perform operations described with respect to process 600 of FIG. 6, process 700 of FIG. 7, and/or other processes as described herein. The stored program codes, when executed by processor 240 and/or other processors and modules at base station 110, may cause the base station 110 to perform operations described with respect to process 600 of FIG. 6, process 700 of FIG. 7, and/or other processes as described herein. A scheduler 246 may schedule UEs for data transmission on the downlink and/or uplink.

In some aspects, UE 120 may include means for receiving, during a discontinuous reception (DRX) active mode, a particular transmission of an indication signal identifying one or more parameters of a physical downlink control channel (PDCCH), wherein a first transmission of the indication signal is transmitted at a beginning of a downlink burst transmission of a base station (BS) and a second transmission of the indication signal is transmitted during the downlink burst transmission of the BS, and wherein the particular transmission is the first transmission or the second transmission, means for receiving the PDCCH in accordance with the one or more parameters of the indication signal based at least in part on receiving the indication signal, and/or the like. In some aspects, such means may include one or more components of UE 120 described in connection with FIG. 2.

In some aspects, base station 110 may include means for transmitting, to a user equipment (UE), a plurality of repetitions of an indication signal to indicate one or more parameters relating to a subsequent transmission of a physical downlink control channel (PDCCH), wherein at least one repetition of the indication signal is transmitted during a discontinuous reception (DRX) active mode of the UE, means for transmitting the PDCCH after the plurality of repetitions of the indication signal and in accordance with the one or more parameters of the indication signal, and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3A:
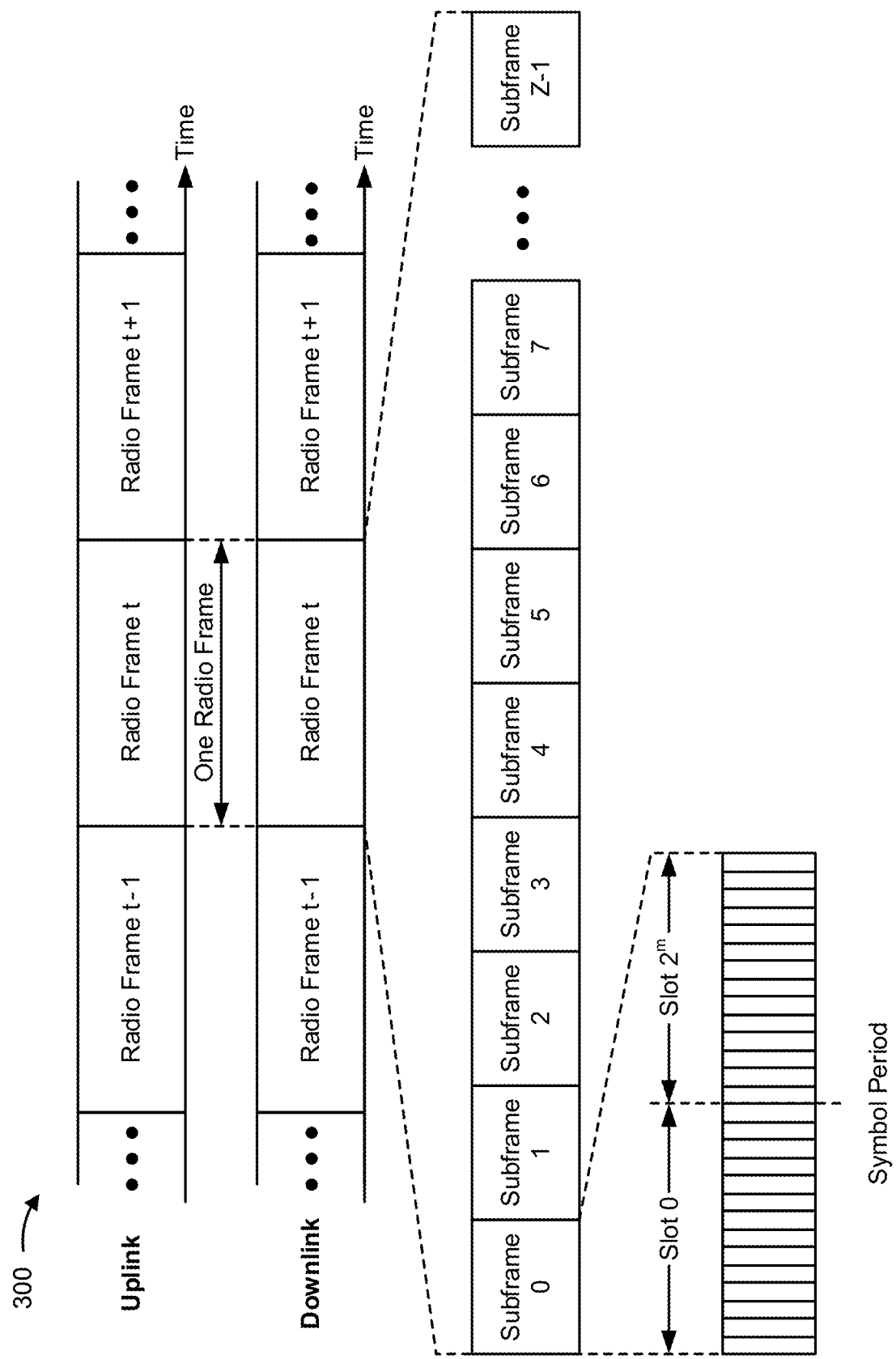
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
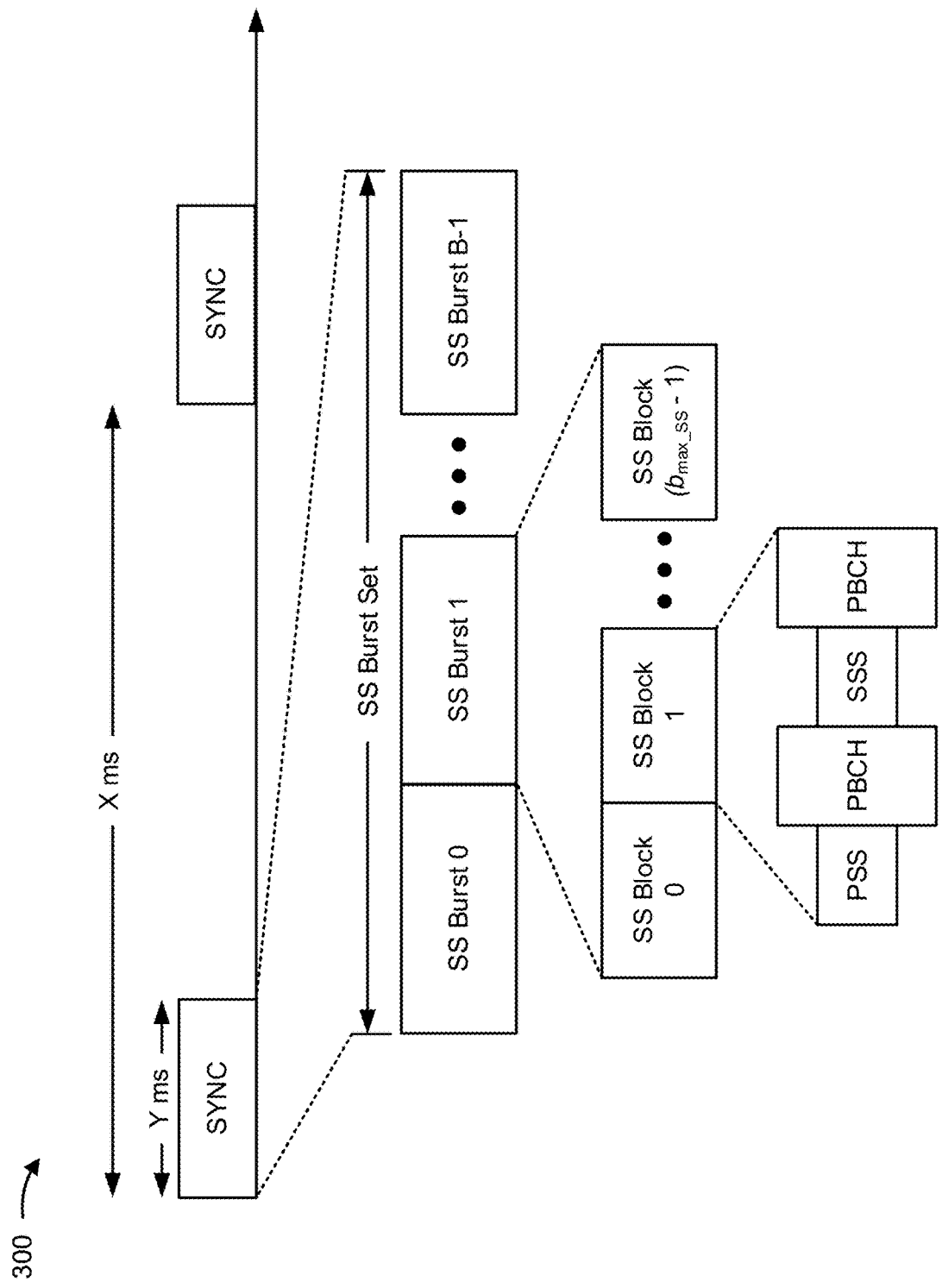
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. In some aspects, the base station may transmit an indication signal to indicate, to a user equipment, a monitoring period for monitoring for the PDCCH. For example, the base station may transmit the indication signal at a beginning of a downlink burst transmission, during a downlink burst transmission, and/or the like. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
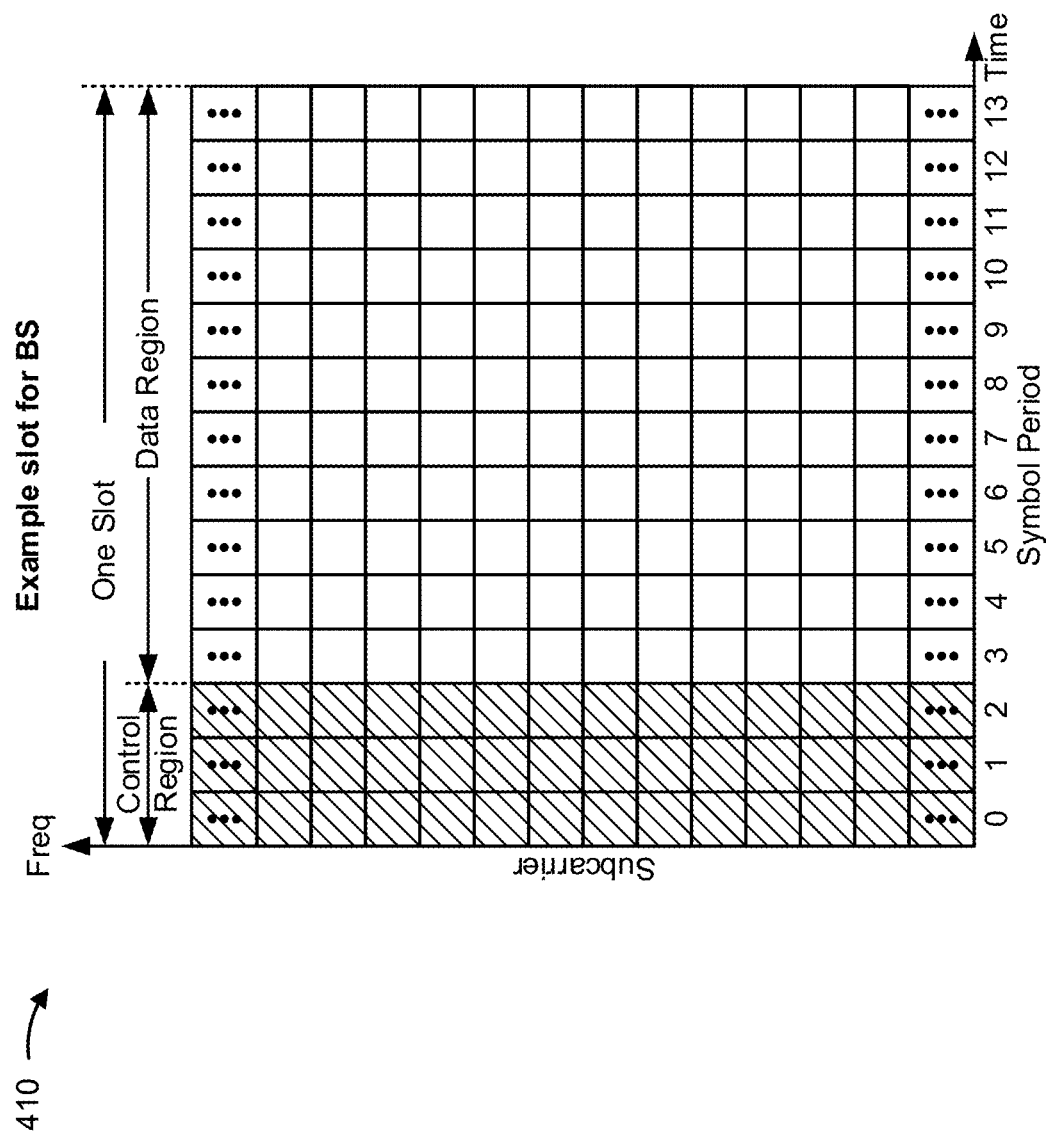
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q ∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 ms duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
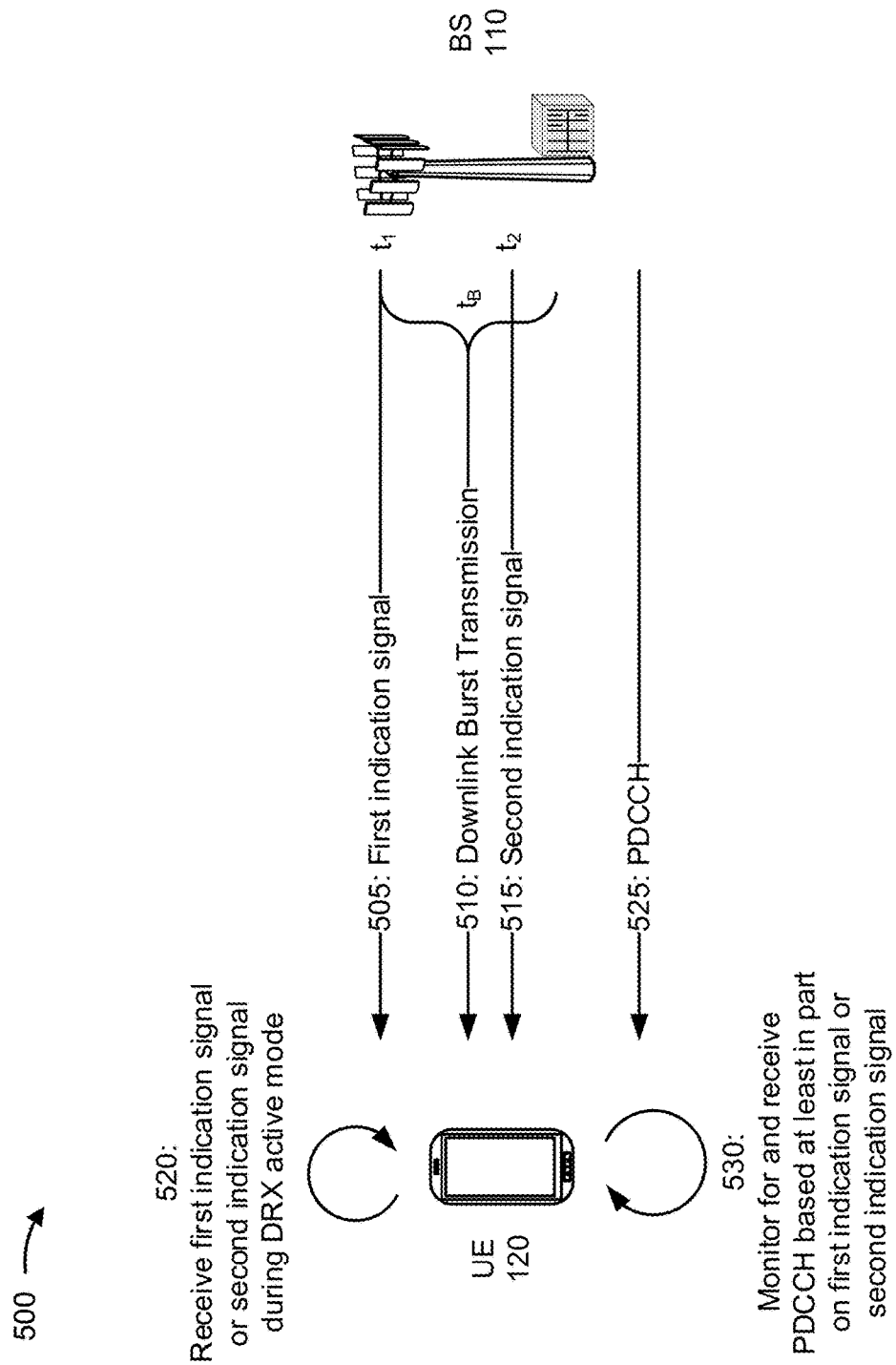
FIG. 5 is a diagram illustrating an example of indication signal repetition for discontinuous reception operation, in accordance with various aspects of the present disclosure.

FIG. 5 is a diagram illustrating an example 500 of indication signal repetition for discontinuous reception operation, in accordance with various aspects of the present disclosure. As shown in FIG. 5, example 500 includes a BS 110 and a UE 120.

As further shown in FIG. 5, and by reference numbers 505, 510, and 515, BS 110 may transmit repetitions of an indication signal in connection with a downlink burst transmission. For example, BS 110 may transmit a first indication signal (e.g., a first transmission of an indication signal) at a beginning of the downlink burst transmission (e.g., at a time $t_1$ of a downlink burst transmission period $t_B$), and may transmit a second indication signal (e.g., a second transmission of the indication signal) during the downlink burst transmission (e.g., at a time $t_2$ of the downlink burst transmission period $t_B$). In some aspects, the indication signal may be a low power signal. For example, BS 110 may transmit a low power signal (e.g., less than a threshold power) to indicate parameters of a subsequent PDCCH transmission (e.g., a high power signal with greater than or equal to the threshold power) to UE 120.

In some aspects, BS 110 may transmit at least one repetition of an indication signal during an ON duration of an active mode of UE 120 (i.e., a DRX active mode). For example, UE 120 may wake up at an ON time before the downlink burst transmission, and may receive the first indication signal. Additionally, or alternatively, UE 120 may wake up at an ON time during the downlink burst transmission and may receive the second indication signal. In some aspects, repetitions of an indication signal may be associated with different contents. For example, BS 110 may include first content in the first indication signal, such as a first system frame number (SFN) indicating a monitoring duration for UE 120 to monitor for a PDCCH. In this case, BS 110 may include second content in the second indication signal, such as a second SFN, which is different from the first SFN, indicating another monitoring duration for UE 120 to monitor for the PDCCH. In some aspects, BS 110 may use different frequency resources, different time resources, and/or the like to transmit repetitions of the indication signal. For example, BS 110 may transmit the first indication signal at a first time using a first frequency and may transmit the second indication signal at a second time that is different from the first time using a second frequency that is different from the first frequency.

In some aspects, the indication signal may include a bit indicator (e.g., one bit) to indicate a current SFN or a next SFN, and another bit indicator (e.g., four bits) to indicate an end point in the SFN for monitoring for the PDCCH. In some aspects, BS 110 may include an indicator of a symbol. For example, BS 110 may include a bit indicator of which symbol in an SFN is an end point for monitoring for the PDCCH. In some aspects, BS 110 may include the same contents in the first indication signal and the second indication signal.

In some aspects, BS 110 may indicate an awake time for UE 120 using the indication signal. For example, BS 110 may indicate an amount of time that UE 120 is to remain in the active mode after receiving the indication signal to enable BS 110 to communicate with UE 120. In this way, BS 110 may enable control of UE 120 to receive the PDCCH outside of a DRX inactivity timer based monitoring period. Additionally, or alternatively, BS 110 may indicate that UE 120 is to transfer to a different DRX mode. For example, BS 110 may include a parameter in the indication signal (e.g., setting a monitoring duration to a zero duration) to indicate that UE 120 is to transfer to a sleep mode. In this way, BS 110 may reduce a power consumption of UE 120 relative to UE 120 monitoring for a PDCCH when BS 110 is not transmitting a PDCCH. Additionally, or alternatively, BS 110 may identify a length of the downlink burst transmission using the indication signal. In this case, UE 120 may monitor for the PDCCH during a time period corresponding to the downlink burst transmission (e.g., during $t_B$), and may cease monitoring for the PDCCH after an end to the downlink burst transmission.

In some aspects, BS 110 may periodically transmit the indication signal. For example, BS 110 may transmit the indication signal in a first slot and may forgo transmitting the indication signal in a second slot. In this way, BS 110 may reduce utilization of power resources and network resources associated with the indication signal. In some aspects, BS 110 may indicate a monitoring periodicity for UE 120 to monitor for the indication signal. For example, BS 110 may indicate, using radio resource control (RRC) message signaling, that UE 120 is to forgo monitoring for the indication signal in one or more slots in a set of consecutive slots. Additionally, or alternatively, BS 110 may indicate, using downlink reference signal (DRS) message signaling, that UE 120 is to forgo one or more ON durations, thereby reducing a power consumption of UE 120 when BS 110 is not to transmit a PDCCH.

Additionally, or alternatively, BS 110 may transmit a plurality of repetitions of the indication signal on a non-periodic basis. For example, BS 110 may transmit a bitmap indicating a set of non-periodic slots in which BS 110 is to transmit the indication signal to UE 120, and may subsequently transmit the indication signal in the set of non-periodic slots.

As further shown in FIG. 5, and by reference number 520, UE 120 may receive the first indication signal or the second indication signal during an active mode. For example, UE 120 may monitor for the downlink burst transmission, and may receive the first indication signal when the first indication signal occurs during a monitoring period. Additionally, or alternatively, when UE 120 is not monitoring for the downlink burst transmission at a start of the downlink burst transmission, UE 120 may receive the second indication signal during a monitoring period that occurs during the downlink burst transmission.

In some aspects, UE 120 may monitor a downlink for the indication signal during an ON duration of the active mode. For example, when UE 120 wakes from an idle mode, UE 120 may monitor a downlink channel to attempt to receive the indication signal in connection with a downlink burst transmission of BS 110. In this case, when UE 120 does not receive an indication signal, UE 120 may start an inactivity timer and transfer back to the idle mode. In contrast, when UE 120 does receive the indication signal, UE 120 may determine a monitoring period for monitoring for a PDCCH based at least in part on one or more parameters of the indication signal.

In some aspects, UE 120 may monitor for the indication signal using a particular periodicity. For example, based at least in part on received RRC signaling or DRS signaling, UE 120 may determine to monitor for the indication signal in one or more slots, during one or more ON durations, and/or the like. In this case, UE 120 may skip one or more ON durations based at least in part on DRS signaling. In some aspects, the DRS signaling may be UE-specific. For example, UE 120 may receive a DRS message indicating that UE 120, only, is to skip monitoring for the indication signal during one or more ON durations. Additionally, or alternatively, UE 120 may receive UE-group-specific DRS signaling indicating that a plurality of UEs 120 are to skip monitoring for the indication signal during one or more ON durations. In some aspects, UE 120 may monitor for the indication signal after transferring to an active mode. Additionally, or alternatively, UE 120 may monitor for the indication signal before an ON time associated with the active mode.

As further shown in FIG. 5, and by reference numbers 525 and 530, BS 110 may transmit a PDCCH, UE 120 may monitor for the PDCCH based at least in part on parameters of the indication signal, and UE 120 may receive the PDCCH based at least in part on monitoring for the PDCCH. For example, during a monitoring period identified based at least in part on the indication signal, UE 120 may receive the PDCCH. In this case, based at least in part on BS 110 transmitting a plurality of indication signals (e.g., a first indication signal, a second indication signal that is a repetition of the first indication signal, and/or the like, and which may each be termed repetitions of an indication signal), BS 110 ensures that UE 120 receives information identifying one or more parameters for receiving the PDCCH. As a result, based at least in part on UE 120 receiving, for example, information identifying a monitoring duration for monitoring for the PDCCH, BS 110 reduces a likelihood of UE 120 failing to receive the PDCCH and improves network performance.

As indicated above, FIG. 5 is provided as an example. Other examples may differ from what is described with respect to FIG. 5.

FIG. 6 is a diagram illustrating an example process 600 performed, for example, by a BS, in accordance with various aspects of the present disclosure. Example process 600 is an example where a BS (e.g., BS 110) performs indication signal repetition for discontinuous reception operation.

As shown in FIG. 6, in some aspects, process 600 may include transmitting, to a user equipment (UE), a plurality of repetitions of an indication signal to indicate one or more parameters relating to a subsequent transmission of a physical downlink control channel (PDCCH), wherein at least one repetition of the indication signal is transmitted during a discontinuous reception (DRX) active mode of the UE (block 610). For example, the BS (e.g., using controller/processor 240, transmit processor 220, TX MIMO processor 230, MOD 232, antenna 234, and/or the like) may transmit, to a user equipment (UE), a plurality of repetitions of an indication signal to indicate one or more parameters relating to a subsequent transmission of a physical downlink control channel (PDCCH), as described in more detail above. In some aspects, at least one repetition of the indication signal is transmitted during a discontinuous reception (DRX) active mode of the UE.

As shown in FIG. 6, in some aspects, process 600 may include transmitting the PDCCH after the plurality of repetitions of the indication signal and in accordance with the one or more parameters of the indication signal (block 620). For example, the BS (e.g., using controller/processor 240, transmit processor 220, TX MIMO processor 230, MOD 232, antenna 234, and/or the like) may transmit the PDCCH after the plurality of repetitions of the indication signal and in accordance with the one or more parameters of the indication signal, as described in more detail above.

Process 600 may include additional aspects, such as any single aspect or any combination of aspects described below and/or in connection with one or more other processes described elsewhere herein.

In a first aspect, a first transmission of the indication signal includes first content and a second transmission of the indication signal includes second content that is different from the first content. In a second aspect, alone or in combination with the first aspect, contents of a first transmission of the indication signal and of a second transmission of the indication signal are the same contents. In a third aspect, alone or in combination with one or more of the first and second aspects, the BS is configured to transmit a first transmission of the indication signal at a beginning of a downlink burst transmission and a second transmission of the indication signal during the downlink burst transmission.

In a fourth aspect, alone or in combination with one or more of the first through third aspects, the indication signal identifies a duration of a wake period for the UE to cause the UE to monitor for the PDCCH during the wake period. In a fifth aspect, alone or in combination with one or more of the first through fourth aspects, a parameter, of the one or more parameters of the indication signal, is configured to cause the UE to enter a sleep mode in connection with receiving the indication signal. In a sixth aspect, alone or in combination with one or more of the first through fifth aspects, the plurality of repetitions of the indication signal include two or more different duration parameters identifying durations for monitoring for the PDCCH.

In a seventh aspect, alone or in combination with one or more of the first through sixth aspects, the two or more different duration parameters are values associated with at least one of: a system frame number or a symbol number. In an eighth aspect, alone or in combination with one or more of the first through seventh aspects, the BS is configured to forgo transmission of the indication signal in one or more slots of a set of consecutive slots. In a ninth aspect, alone or in combination with one or more of the first through eighth aspects, the BS is configured to transmit a radio resource control message identifying one or more DRX parameters and a monitoring configuration identifying a monitoring periodicity for monitoring for the indication signal.

In a tenth aspect, alone or in combination with one or more of the first through ninth aspects, the BS is configured to transmit an indicator of a non-periodic set of monitoring occasions for monitoring for the indication signal. In an eleventh aspect, alone or in combination with one or more of the first through tenth aspects, the BS is configured to transmit a downlink reference signal message to indicate one or more periods DRX active mode periods to forgo monitoring for the indication signal. In a twelfth aspect, alone or in combination with one or more of the first through eleventh aspects, the downlink reference signal message is a UE-specific message or a UE-group-specific message. In a thirteenth aspect, alone or in combination with one or more of the first through twelfth aspects, the BS is configured to transmit a first transmission of the indication signal using a first frequency resource or a first time resource and a second transmission of the indication signal using a second frequency resource that is different from the first frequency resource or a second time resource that is different from the first time resource.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a UE, in accordance with various aspects of the present disclosure. Example process 700 is an example where a UE (e.g., UE 120) performs indication signal repetition for discontinuous reception operation.

As shown in FIG. 7, in some aspects, process 700 may include receiving, during a discontinuous reception (DRX) active mode, a particular transmission of an indication signal identifying one or more parameters of a physical downlink control channel (PDCCH), wherein a first transmission of the indication signal is transmitted at a beginning of a downlink burst transmission of a base station (BS) and a second transmission of the indication signal is transmitted during the downlink burst transmission of the BS, and wherein the particular transmission is the first transmission or the second transmission (block 710). For example, the UE (e.g., using controller/processor 280, transmit processor 264, TX MIMO processor 266, MOD 254, antenna 252, and/or the like) may receive, during a discontinuous reception (DRX) active mode, a particular transmission of an indication signal identifying one or more parameters of a physical downlink control channel (PDCCH), as described in more detail above. In some aspects, a first transmission of the indication signal is transmitted at a beginning of a downlink burst transmission of a base station (BS) and a second transmission of the indication signal is transmitted during the downlink burst transmission of the BS. In some aspects, the particular transmission is the first transmission or the second transmission.

As shown in FIG. 7, in some aspects, process 700 may include receiving the PDCCH in accordance with the one or more parameters of the indication signal based at least in part on receiving the indication signal (block 720). For example, the UE (e.g., using controller/processor 280, transmit processor 264, TX MIMO processor 266, MOD 254, antenna 252, and/or the like) may receive the PDCCH in accordance with the one or more parameters of the indication signal based at least in part on receiving the indication signal, as described in more detail above.

Process 700 may include additional aspects, such as any single aspect or any combination of aspects described below and/or in connection with one or more other processes described elsewhere herein.

In a first aspect, the UE is configured to monitor a downlink during the DRX active mode. In a second aspect, alone or in combination with the first aspect, the DRX active mode repeats periodically. In a third aspect, alone or in combination with one or more of the first and second aspects, the UE is configured to start an inactivity timer based at least in part on not detecting any transmission from the B S during the DRX active mode.

In a fourth aspect, alone or in combination with one or more of the first through third aspects, the UE is configured to restart an inactivity timer based at least in part on detecting the particular transmission of the indication signal. In a fifth aspect, alone or in combination with one or more of the first through fourth aspects, the UE is configured to monitor for PDCCH based at least in part on detecting the particular transmission of the indication signal. In a sixth aspect, alone or in combination with one or more of the first through fifth aspects, the UE is configured to monitor for the PDCCH for a period of time identified based at least in part on the indication signal.

In a seventh aspect, alone or in combination with one or more of the first through sixth aspects, the UE is configured to transfer to a sleep mode based at least in part on the indication signal. In an eighth aspect, alone or in combination with one or more of the first through seventh aspects, the UE is configured to monitor for the PDCCH for a duration of the downlink burst transmission. In a ninth aspect, alone or in combination with one or more of the first through eighth aspects, the UE is configured to forgo monitoring for the indication signal in one or more slots of a set of consecutive slots based at least in part on a monitoring configuration.

In a tenth aspect, alone or in combination with one or more of the first through ninth aspects, the UE is configured to determine the monitoring configuration based at least in part on a radio resource control message associated with indicating one or more DRX parameters. In an eleventh aspect, alone or in combination with one or more of the first through tenth aspects, the UE is configured to monitor for the indication signal before transferring to the DRX active mode. In a twelfth aspect, alone or in combination with one or more of the first through eleventh aspects, the UE is configured to forgo monitoring for the indication signal during one or more DRX active mode periods based at least in part on a monitoring configuration. In a thirteenth aspect, alone or in combination with one or more of the first through twelfth aspects, the monitoring configuration is identified based at least in part on a downlink reference signal message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless node, comprising:
    transmitting, to a user equipment (UE), a plurality of repetitions of an indication signal to indicate one or more parameters relating to a subsequent transmission of a physical downlink control channel (PDCCH),
        wherein at least one repetition of the indication signal is transmitted during a discontinuous reception (DRX) active mode of the UE and provides a first duration, for the UE to remain in the DRX active mode, different from a second duration for which the UE is configured to monitor for a downlink during the DRX active mode; and
    transmitting the PDCCH after the plurality of repetitions of the indication signal and in accordance with the one or more parameters of the indication signal.

2. The method of claim 1, wherein a first transmission of the indication signal includes first content and a second transmission of the indication signal includes second content that is different from the first content.

3. The method of claim 1, wherein contents of a first transmission of the indication signal and of a second transmission of the indication signal are the same contents.

4. The method of claim 1, further comprising:
    transmitting a first transmission of the indication signal at a beginning of a downlink burst transmission and a second transmission of the indication signal during the downlink burst transmission.

5. The method of claim 1, further comprising:
    transmitting a first transmission of the indication signal using a first frequency resource or a first time resource and a second transmission of the indication signal using a second frequency resource that is different from the first frequency resource or a second time resource that is different from the first time resource.

6. The method of claim 1, wherein a parameter, of the one or more parameters of the indication signal, is configured to cause the UE to enter a sleep mode in connection with receiving the indication signal.

7. The method of claim 1, wherein the plurality of repetitions of the indication signal includes two or more different duration parameters identifying durations for monitoring for the PDCCH.

8. The method of claim 7, wherein the two or more different duration parameters are values associated with at least one of: a system frame number or a symbol number.

9. The method of claim 1, further comprising:
    forgoing transmission of the indication signal in one or more slots of a set of consecutive slots.

10. The method of claim 1, further comprising:
    transmitting a radio resource control message identifying one or more DRX parameters and a monitoring configuration identifying a monitoring periodicity for monitoring for the indication signal.

11. The method of claim 1, further comprising:
    transmitting an indicator of a non-periodic set of monitoring occasions for monitoring for the indication signal.

12. The method of claim 1, further comprising:
transmitting a downlink reference signal message to indicate one or more DRX active mode periods to forgo monitoring for the indication signal.

13. The method of claim 12, wherein the downlink reference signal message is a UE-specific message or a UE-group-specific message.

14. A method of wireless communication performed by a user equipment (UE), comprising:
receiving, during a discontinuous reception (DRX) active mode, a first or second transmission of an indication signal identifying one or more parameters of a physical downlink control channel (PDCCH) and providing a first duration for the UE to remain in the DRX active mode,
wherein the first transmission of the indication signal is transmitted at a beginning of a downlink burst transmission of a wireless node and the second transmission of the indication signal is transmitted during the downlink burst transmission of the wireless node, and
wherein first duration is different from a second duration for which the UE is configured to monitor for a downlink during the DRX active mode; and
receiving the PDCCH in accordance with the one or more parameters of the indication signal based at least in part on receiving the indication signal.

15. The method of claim 14, further comprising:
monitoring the downlink during the DRX active mode.

16. The method of claim 14, wherein the DRX active mode repeats periodically.

17. The method of claim 14, further comprising:
starting an inactivity timer based at least in part on not detecting any transmission from the wireless node during the DRX active mode.

18. The method of claim 14, further comprising:
restarting an inactivity timer based at least in part on detecting the first or second transmission of the indication signal.

19. The method of claim 14, further comprising:
monitoring for the PDCCH based at least in part on detecting the first or second transmission of the indication signal.

20. The method of claim 14, further comprising:
transferring to a sleep mode based at least in part on the indication signal.

21. The method of claim 14, further comprising:
monitoring for the PDCCH for a duration of the downlink burst transmission.

22. The method of claim 14, wherein the UE is configured to forgo monitoring for the indication signal in one or more slots of a set of consecutive slots based at least in part on a monitoring configuration.

23. The method of claim 22, further comprising:
determining the monitoring configuration based at least in part on a radio resource control message associated with indicating one or more DRX parameters.

24. The method of claim 14, further comprising:
monitoring for the indication signal before transferring to the DRX active mode.

25. The method of claim 14, wherein the UE is configured to forgo monitoring for the indication signal during one or more DRX active mode periods based at least in part on a monitoring configuration.

26. The method of claim 25, wherein the monitoring configuration is identified based at least in part on a downlink reference signal message.

27. A wireless node for wireless communication, comprising:
a memory; and
one or more processors coupled to the memory, the one or more processors configured to:
transmit, to a user equipment (UE), a plurality of repetitions of an indication signal to indicate one or more parameters relating to a subsequent transmission of a physical downlink control channel (PDCCH),
wherein at least one repetition of the indication signal is transmitted during a discontinuous reception (DRX) active mode of the UE and provides a first duration, for the UE to remain in the DRX active mode, different from a second duration for which the UE is configured to monitor for a downlink during the DRX active mode; and
transmit the PDCCH after the plurality of repetitions of the indication signal and in accordance with the one or more parameters of the indication signal.

28. A user equipment (UE) for wireless communication, comprising:
a memory; and
one or more processors coupled to the memory, the one or more processors configured to:
receive, during a discontinuous reception (DRX) active mode, a first or second transmission of an indication signal identifying one or more parameters of a physical downlink control channel (PDCCH) and providing a duration for the UE to remain in the DRX active mode,
wherein the first transmission of the indication signal is transmitted at a beginning of a downlink burst transmission of a wireless node and the second transmission of the indication signal is transmitted during the downlink burst transmission of the wireless node, and
wherein first duration is different from a second duration for which the UE is configured to monitor for a downlink during the DRX active mode; and
receive the PDCCH in accordance with the one or more parameters of the indication signal based at least in part on receiving the indication signal.

29. The UE of claim 28, wherein the one or more processors are further configured to:
monitor the downlink during the DRX active mode.

30. The UE of claim 28, wherein the one or more processors are further configured to:
start an inactivity timer based at least in part on not detecting any transmission from the wireless node during the DRX active mode.

* * * * *